(12) United States Patent
Himmelmann

(10) Patent No.: US 7,389,712 B2
(45) Date of Patent: Jun. 24, 2008

(54) BI-DIRECTIONAL TWO MODE INPUT, UNI-DIRECTIONAL SINGLE MODE OUTPUT DRIVE TRAIN

(75) Inventor: Richard A. Himmelmann, Beloit, WI (US)

(73) Assignee: Hamilton Sundstrand Corporation, Rockford, IL (US)

( * ) Notice: Subject to any disclaimer, the term of this patent is extended or adjusted under 35 U.S.C. 154(b) by 316 days.

(21) Appl. No.: 11/284,383

(22) Filed: Nov. 21, 2005

(65) Prior Publication Data

US 2007/0113703 A1    May 24, 2007

(51) Int. Cl.
*F16H 37/06*    (2006.01)
*F16H 3/00*    (2006.01)

(52) U.S. Cl. .................. 74/665 B; 74/664; 74/810.1

(58) Field of Classification Search ............... 74/661, 74/664, 665 A, 665 B, 665 D, 665 E, 404, 74/329, 333, 810.1–810.2, 413, 414, 421
See application file for complete search history.

(56) References Cited

U.S. PATENT DOCUMENTS

| | | | | |
|---|---|---|---|---|
| 1,056,610 A | * | 3/1913 | Watkins | 173/215 |
| 2,872,003 A | * | 2/1959 | Nussbaumer et al. | 192/51 |
| 3,666,063 A | * | 5/1972 | Schoeman et al. | 192/21 |
| 3,981,208 A | * | 9/1976 | Moses | 74/810.1 |
| 4,405,029 A | * | 9/1983 | Hunt | 180/65.2 |
| 4,924,720 A | * | 5/1990 | Shust | 74/377 |
| 5,159,854 A | * | 11/1992 | Mino et al. | 74/810.1 |
| 5,435,794 A | * | 7/1995 | Mori et al. | 475/343 |
| 6,601,467 B1 | * | 8/2003 | Futterer | 74/421 A |
| 6,931,954 B2 | * | 8/2005 | Jinbo | 74/64 |

* cited by examiner

*Primary Examiner*—Roger Pang
(74) *Attorney, Agent, or Firm*—Kinney & Lange, P.A.

(57) ABSTRACT

A gear and clutch cluster receives rotational input from a bi-rotational input gear. The gear and clutch cluster produces rotational output in a driveshaft of a drive train in a single direction for both rotation directions of the bi-rotational input.

27 Claims, 3 Drawing Sheets

US 7,389,712 B2

BI-DIRECTIONAL TWO MODE INPUT, UNI-DIRECTIONAL SINGLE MODE OUTPUT DRIVE TRAIN

BACKGROUND OF THE INVENTION

This invention relates generally to drive train systems for converting and conveying rotational energy. More particularly, the present invention relates to a gear and clutch cluster for driving a drive train having a bi-directional input and a uni-directional output, which can be used, for example, in transmission lubrication systems of vehicles.

In vehicles having transmissions composed of complex mechanical systems, it is necessary to lubricate moving parts in order to dissipate heat and facilitate smooth operation of the transmission. It is convenient to utilize the power generated by the already moving parts of the transmission to drive pumps that provide lubrication to the moving parts. The pumps must provide continuous lubrication to the moving parts for all operative modes of the transmission. However, in land based vehicles, such as wheeled or tracked vehicles, that operate in both forward and reverse directions, pumps running off the transmission will direct lubrication toward the moving parts in only the forward direction, with the pumps drawing lubrication away from the transmission in the reverse direction. A second pump system can be implemented with reverse gearing to provide the necessary lubrication to the transmission in the reverse direction, or valve systems can be added to the pump system to reroute the lubrication flow toward the moving parts in the reverse direction. However, adding additional pump or valve systems adds considerable complexity to the mechanics of the lubrication system, in addition to increasing costs.

BRIEF SUMMARY OF THE INVENTION

In the present invention, a gear and clutch cluster produces uni-rotational output of a driveshaft from a bi-rotational input gear. The gear cluster comprises a first spur gear, an idler gear, a second spur gear, a first clutch and a second clutch. The first spur gear and the idler gear are engaged with the bi-directional input gear. The second spur gear is engaged with the idler gear. The first clutch is connectable with the driveshaft at an inner diameter and concentrically connected with the first spur gear at an outer diameter. The first clutch engages the driveshaft when the first spur gear rotates in a first direction faster than the driveshaft rotates in the first direction. The second clutch is connectable with the driveshaft at an inner diameter and concentrically connected with the second spur gear at an outer diameter. The second clutch engages the driveshaft when the second spur gear rotates in a first direction at a faster rate than the driveshaft rotates in the first direction.

DETAILED DESCRIPTION

Figure 1:
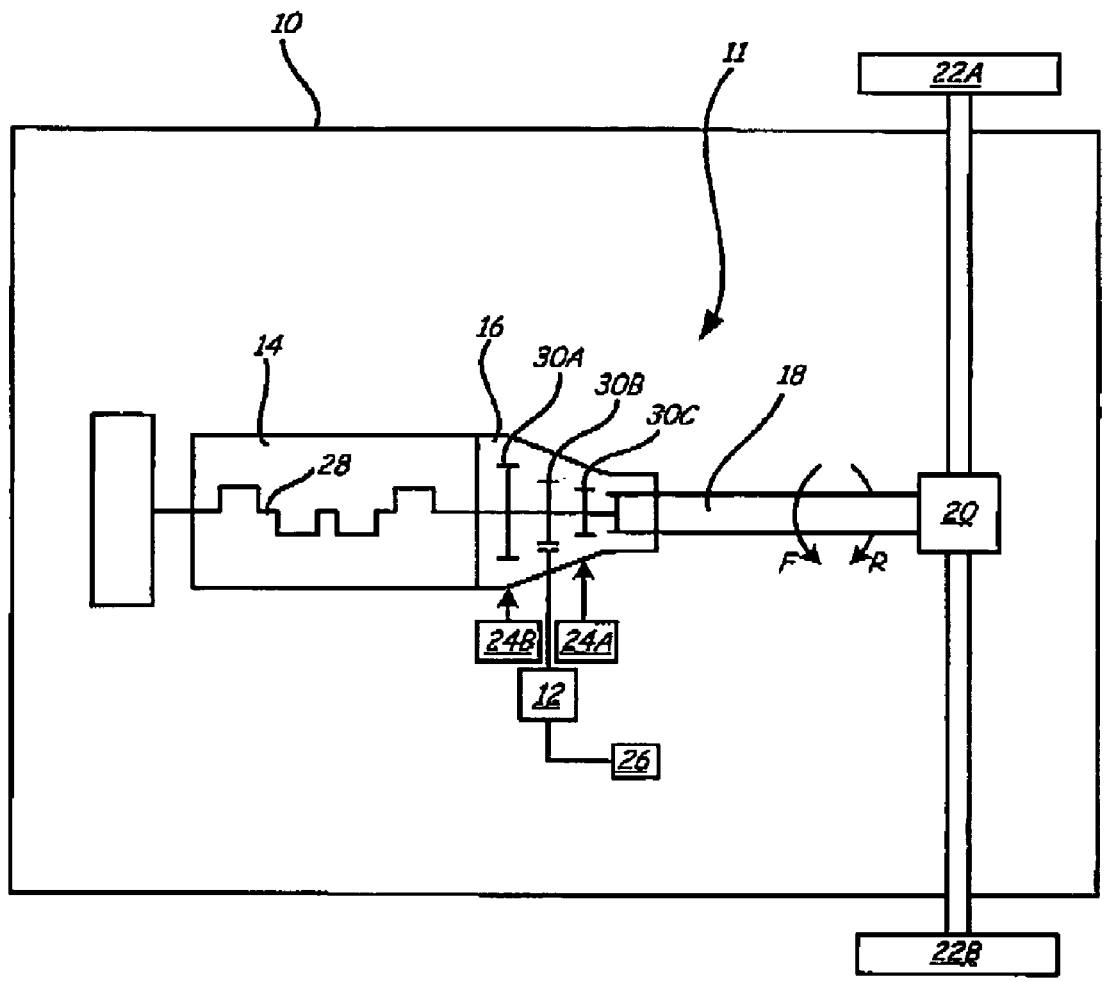
FIG. 1 is a block diagram of a vehicle having a power train system in which the drive train system of the present invention is used.

FIG. 1 is a block diagram of vehicle 10 having power train system 11 in which drive train system 12 of the present invention is used. Power train system 11 is comprised of drive train system 12, engine 14, transmission 16, propulsion shaft 18, differential 20, propulsion devices 22A and 22B, first fluid pump 24A, second fluid pump 24B and auxiliary input 26.

Engine 14 includes crankshaft 28 and is the prime mover of power train system 11. Engine 14 provides the power that ultimately drives vehicle 10 through propulsion devices 22A and 22B. Engine 14 produces a uni-directional rotation of crankshaft 28. Transmission 16 receives the output of crankshaft 28 and produces a variable speed, bi-direction output for rotating porpulsion shaft 18. Transmission 16 includes gears 30A-30C, which are representative of counter shaft gearing of a parallel shaft transmission, typically used to produce variable output speeds. In other embodiments, drive train system can be operated off of any bi-rotational gear. Transmission 16 and gears 30A-30C produce output of propulsion shaft 18 in forward and reverse directions, represented by arrows F and R in FIG. 1. Driveshaft 18 relays the bi-directional output of transmission 16 to differential 20. Differential 20 splits the output of propulsion shaft 18 and redirects it to propulsion devices 22A and 22B. Propulsion devices 22A and 22B typically comprise a set of wheels or tracks that are in contact with a surface and which rotate to move vehicle 10.

Transmission 16 is constantly engaged with propulsion devises 22A and 22B. Therefore, gears 30A-30C of transmission 16 are also constantly moving whenever propulsion devices 22A and 22B are rolling over a surface either through power supplied by engine 14 or another source, such as a tow vehicle or wrecker. In all situations, transmission 16 must be supplied with lubrication. Drive train system 12 and fluid pumps 24A and 24B supply lubrication to transmission 16 for all operative modes of vehicle 12, i.e. in the forward and reverse direction. Fluid pumps 24A and 24B are used to dispense lubrication from a reservoir to transmission 16 and/or another destination, and to return the dispensed lubrication to the reservoir. In order to ensure transmission 16 receives lubrication flow from fluid pumps 24A and 24B, drive train system 12 is also constantly engaged with transmission 16. Therefore, transmission 16 is also producing rotational output to drive train system 12 whenever propulsion devices 22A and 22B are rolling. Drive train system 12 thus receives both forward and reverse input from gear 30B whenever vehicle transmission 16 is moving either forward or backward. Drive train system 12 includes gearing and clutching for receiving bi-directional input from gear 30B of transmission 16 and producing uni-directional output for driving first fluid pump 24A and second fluid pump 24B. Thus, fluid pumps 24A and 24B provide a positive flow of lubrication to transmission 16 with the power generated by gear 30B in both the forward and backward direction.

Auxiliary input 26 provides a secondary mode for powering drive train system 12. When vehicle transmission 16 does not rotate fast enough to drive fluid pumps 24A and 24B sufficiently, auxiliary input 26 is engaged, either by a computer controller or manual operation. Drive train system 12 includes clutching for overriding the bi-directional rotational input of gear 30B to drive train system 12 with auxiliary input 26. The gearing and clutching of drive train system 12 is responsive to whichever of gear 30B and auxiliary input 26 that produces the higher output rate of fluid pumps 24A and 24B.

Figure 2:
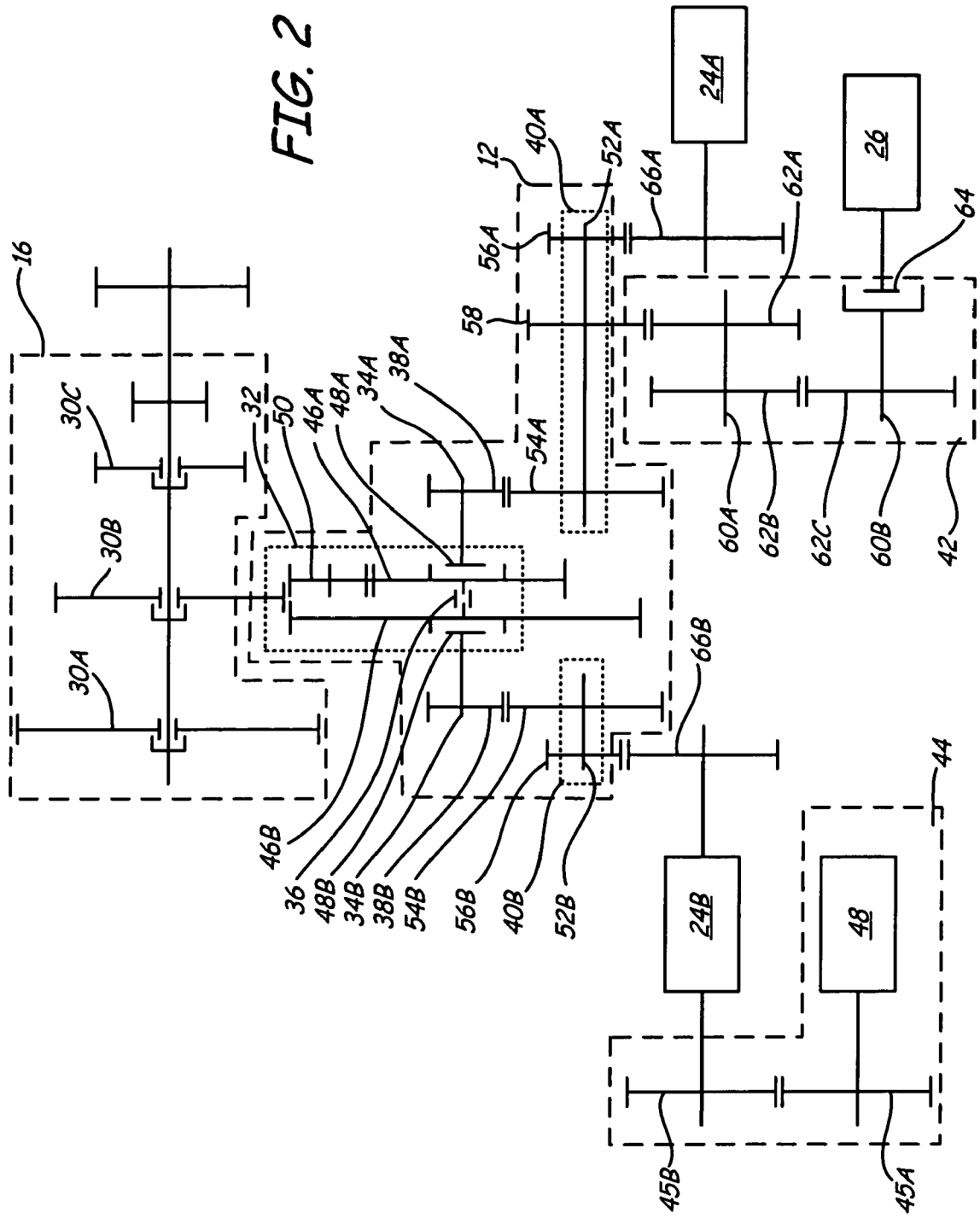
FIG. 2 is a schematic diagram of the drive train system of the present invention as implemented in the drive train system of FIG. 1.

FIG. 2 shows a schematic view of drive train system 12 of the present invention coupled with transmission 16 of drive train system 11 of FIG. 1. Drive train system 12 is comprised of gear and clutch cluster 32, first driveshaft segment 34A, second driveshaft segment 34B, spline 36, first output coupling 38A, second output coupling 38B, first output assembly 40A and second output assembly 40B. Drive train system 12 is also coupled with first fluid pump 24A, second fluid pump 24B, auxiliary input 26, auxiliary gear system 42 and supplemental fluid pump system 44.

Gear and clutch cluster 32 is comprised of first input gear 46A, first clutch 48A, second input gear 46B, second clutch 48B and input idler gear 50. First output assembly 40A is comprised of driveshaft 52A, idler gear 54A, idler gear 56A and auxiliary input gear 58. Second output assembly 40B is comprised of driveshaft 52B, idler gear 54B and idler gear 56B. Auxiliary gear system 42 includes driveshaft 60A, idler gear 62A, idler gear 62B, driveshaft 60B, idler gear 62C and third clutch 64. First fluid pump 24A includes first pump idler gear 66A, and second fluid pump 24B includes second pump idler gear 66B. Supplemental output device system 44 includes idler gears 45A and 45B, and supplemental fluid pump 48.

Drive train system 12 receives bi-rotational input from gear 30B and transmits it to first fluid pump 24A and second fluid pump 24B for lubricating transmission 16. Gear and clutch cluster 32 converts the bi-directional input of gear 30B into a uni-directional output so that pumps 24A and 24B always provide transmission 16 with a positive flow of lubrication.

Drive train system 12 is connected to bi-directional drive gear 30B of transmission 16 through gear and clutch cluster 32. First input gear 46A is coupled with drive gear 30B through idler gear 50. Second input gear 46B is directly coupled with drive gear 30B at its outer diameter. Thus, first input gear 46A and second input gear 46B always rotate in opposite directions. First input gear 46A is coupled with first driveshaft segment 34A at its inner diameter through first clutch 48A. Second input gear 46B is coupled with second driveshaft segment 34B at its inner diameter through second clutch 48B. First driveshaft segment 34A is coupled with second driveshaft segment 34B with spline 36 so that the driveshaft segments rotate uniformly. Thus, drive gear 30B is coupled with first driveshaft segment 34A and second driveshaft segment 34B, and the power generated by drive gear 30B is transmitted to driveshaft segments 34A and 34B.

The power generated by first driveshaft segment 34A and second driveshaft segment 34B is transmitted to first fluid pump 24A and second fluid pump 24B so that lubrication can be delivered to transmission 16. First driveshaft segment 34A and second driveshaft segment 34B are coupled with first output coupling 38A and second output coupling 38B, which are coupled with first and second output assemblies 40A and 40B. Output assemblies 40A and 40B are comprised of gearing for stepping-up or stepping-down the output of driveshaft segments 34A and 34B. Output assemblies 40A and 40B provide a means for re-positioning the output of driveshaft segments 34A and 34B and can be constructed according to the particular size and space limitations of vehicle 10.

First output coupling 38A and second output coupling 38B are connected with idler gears 54A and 54B, respectively. Idler gears 54A and 54B are coupled with idler gears 56A and 56B through driveshafts 52A and 52B. Output assemblies 40A and 40B thus invert the output of output couplings 38A and 38B, and fluid pumps 24A and 24B are selected to produce positive output flow based on the final output rotation of output assemblies 40A and 40B. Idler gears 56A and 56B are coupled with fluid pumps 24A and 24B through pump idler gears 66A and 66B. Thus, the power generated by input gear 30B is distributed to first fluid pump 24A and second fluid pump 24B through gear and clutch cluster 32, first and second driveshaft segments 34A and 34B, and first and second output assemblies 40A and 40B. In other embodiments, pumps 24A and 24B are directly coupled with first output coupling 38A and second output coupling 38B, respectively. In other embodiments, pumps 24A and 24B are coupled with first and second drive shaft segments 34A and 34B.

For situations when vehicle 10 does not roll fast enough to adequately power fluid pumps 24A and 24B, power train system 12 is supplemented with an auxiliary power source, auxiliary input 26. Auxiliary input 26 is connected with first driveshaft segment 34A through first output assembly 40A and auxiliary gear system 42. First output assembly 40A includes auxiliary idler gear 58, which provides a connection for auxiliary gear system 42. Auxiliary gear system 42 includes third clutch 64, which prevents auxiliary input 26 from interfering with the input of gear 30B by selectively engaging driveshaft 60B. Auxiliary gear system 42 provides a means for positioning auxiliary input 26 with respect to first output assembly 40A and can be constructed according to the particular size and space limitations of vehicle 10. Auxiliary gear system 42 inverts the output of output assembly 42A, and the input of auxiliary input 26 is selected to produce rotation of first driveshaft segment 34A consistent with the uni-directional rotation generated by gear and clutch cluster 32. In other embodiments, auxiliary input 26 is directly coupled with first output assembly 40A or first driveshaft segment 34A through third clutch 64.

Additionally, drive train system 12 can be equipped with supplemental fluid pump system 44 for providing additional fluid throughput to or from transmission 16. For example, fluid pump 48 and idler gears 45A and 45B can supplement fluid pump 24B when, for space considerations, fluid pump 24B cannot be large enough to deliver enough lubrication.

Figure 3:
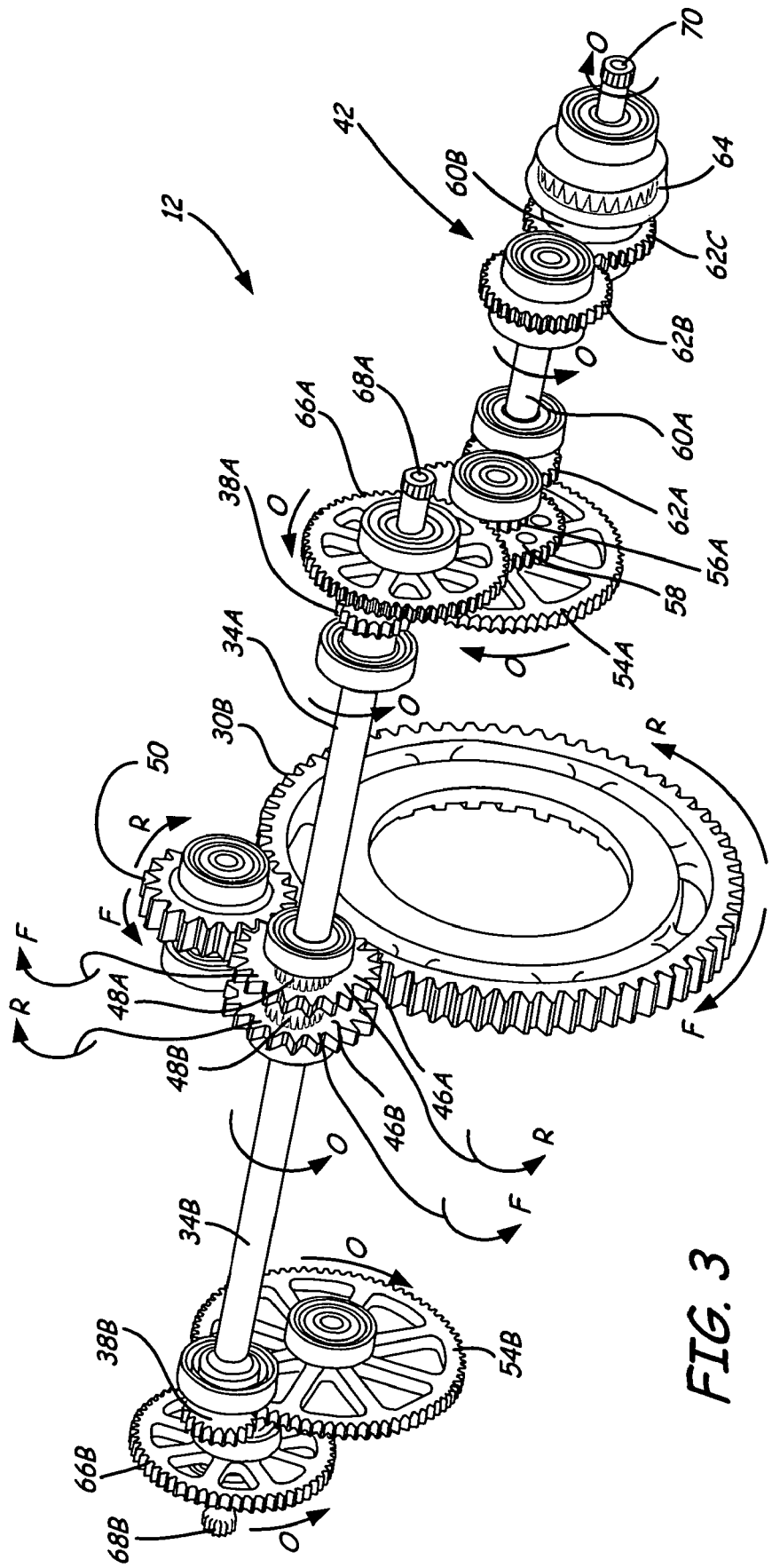
FIG. 3 shows one embodiment of a bi-directional two mode input, unidirectional single mode output drive train system of the present invention.

FIG. 3 shows one embodiment of a bi-directional two mode input, uni-directional single mode output drive train system of the present invention. The schematic of drive train system 12 of FIG. 2 is shown in FIG. 3 with preferred components, with corresponding numerals used throughout. The specific size, shape, location, dimensions, gear ratios etc. of the components shown in FIG. 3 correspond to the specific design requirements of one particular embodiment of the invention. In other embodiments, the parameters can be altered to fit specific needs. Arrows designated with an F or an R refer to the drive sequence of gears 30B, 46A, 46B and 50 during either the forward or reverse operational mode of vehicle 10, and indicate the local rotation of each element. Arrows designated with an O indicate the drive sequence of the uni-directional output rotation of drive train system 12, and indicate the local rotation of each element. The selection of the forward and reverse directions F and R is an arbitrary choice and can be selected to meet specific design needs. As the series of O arrows indicate, for both operational modes F and R of drive gear 30B, couplings 68A and 68B always produce output rotation of driveshafts 34A and 34B, and output couplings 68A and 68B in direction O.

Gear 30B of transmission 16 engages first input gear 46A and input idler gear 50. Gear 30B rotates in direction F and direction R, depending on the operational mode of transmission 16. First input gear 46A is coupled with gear 30B through idler gear 50. Second input gear 46B is directly coupled with gear 30B. Second input gear 46B is coupled with second driveshaft segment 34B at its inner diameter through second clutch 48B. First input gear 46A is coupled with first driveshaft segment 34A at its inner diameter through first clutch 48A. First driveshaft segment 34A is coupled with second driveshaft segment 34B with spline 36

(shown in FIG. 2) so that the driveshaft segments 34A and 34B rotate uniformly. In other embodiments, a single driveshaft segment is used. Thus, first input gear 46A, second input gear 46B and input idler gear 50 engage drive gear 30B such that clutches 48A and 48B rotate in opposite directions. When gear 30B rotates in forward direction F, power is transmitted through gear 46B and clutch 48B to shafts 34A and 34B, producing rotation of shafts 34A and 34B in direction O. However, when gear 30B rotates in reverse direction R, power is transmitted through idler gear 50, gear 46A and clutch 48A to shafts 34A and 34B, producing rotation of shafts 34A and 34B in direction O.

First clutch 48A engages first driveshaft segment 34A when first input gear 46A rotates in direction R faster than first driveshaft segment 34A rotates in direction O. First driveshaft segment 34A will not be engaged by first clutch 48A when drive gear 30B rotates first input gear 46A in direction F. Thus, first clutch 48A typically engages first driveshaft segment 34A when first clutch 48A is rotated in direction R by first input gear 46A. However, when first driveshaft segment 34A is rotating in direction O (as by auxiliary input 26) faster than first input gear 46A rotates in direction R, first input gear 46A is rotating in direction F relative to the rotation of first driveshaft segment 34A and first clutch 48A does not engage first driveshaft segment 34A.

Second clutch 48B engages second driveshaft segment 34B when second input gear 46B rotates in direction F faster than second driveshaft segment 34B rotates in direction O. Second driveshaft segment 34B will not be engaged by second clutch 48B when drive gear 30B rotates second input gear 46B in second direction R. Thus, second clutch 48B typically engages second driveshaft segment 34B when second clutch 36 is rotated in direction F by second input gear 46B. However, when second driveshaft segment 34B is rotating in direction O (as by auxiliary input 26) faster than second input gear 46B rotates in direction F, second input gear 46B is rotating in direction R relative to the rotation of second driveshaft segment 34B and second clutch 48B does not engage second driveshaft segment 34B.

Thus, when auxiliary drive 26 is not engaged and drive gear 30B rotates in direction R, first input gear 46A rotates in direction R through idler gear 50 and first clutch 48A engages first driveshaft segment 34A. Also, when drive gear 30B rotates in direction R, second input gear 46B rotates in direction R and second clutch 48B does not engage second driveshaft segment 34B. Conversely, when drive gear 30A rotates in direction F, first input gear 46A rotates in direction F, and first clutch 48A does not engage first driveshaft segment 34A. However, second input gear 46B is rotated in direction F when drive gear 30B rotates in first direction F. Thus, second driveshaft segment 34B is engaged by second clutch 48B and is rotated in direction O. Accordingly, driveshaft segment 34A receives rotational input in direction O from second driveshaft segment 34B through spline 36. Thus, both first driveshaft segment 34A and second driveshaft segment 34B are uniformly rotated in direction O when input gear 30B rotates in either direction F or direction R.

The output rotation of driveshaft segment 34A is transmitted to first output assembly 40A through output coupling 38A. Output coupling 38A rotates in direction O, the same as first driveshaft segment 34A. Therefore, idler gear 54A and 56A of first output assembly 40 rotate in direction O. Idler gear 56A rotates pump idler gear 66A in direction O. Rotation of pump idler gear 66B in direction O is produced in a similar fashion with output coupling 38B, idler gear 54B and idler gear 56B. Pump idler gears 66A and 66B are connected to fluid pumps 24A and 24B with couplings 68A and 68B. Gear and clutch cluster 32 thus creates uni-directional output in direction O for driving pumps 24A and 24B, regardless of the direction in which vehicle 10 is rolling. In other embodiments of the invention, only one driveshaft segment and output assembly is used. In the embodiment shown in FIGS. 1-3, the output of gear and clutch cluster 32 is split in order to provide two streams of fluid flow. First fluid pump 24A is used to dispense lubrication from a reservoir to transmission 16, and/or any other vehicle system requiring lubrication, such as a brake system. Second fluid pump 24B is used to recover the dispensed lubrication from transmission 16 and return it to the reservoir.

Vehicle 10, however, must be driven or rolled at speeds fast enough to drive pumps 24A and 24B with gear 30B at a rate sufficient to adequately lubricate transmission 16. When the speed of vehicle 10 is too slow, pumps 24A and 24B do not provide enough lubrication to transmission 16, but transmission 16 still requires lubrication any time vehicle 10 is in motion. Thus, drive train system 12 is provided with auxiliary input 26 (shown in FIG. 2).

Auxiliary input 26 is connected with auxiliary gear system 42 through coupling 70. Third clutch 64 links auxiliary input 26 with driveshaft 60B of auxiliary gear system 42. Driveshaft 60B rotates idler gear 62C. Idler gear 62C rotates idler gear 62B, which in turn rotates driveshaft 60A and idler gear 62A. Idler gear 62A rotates auxiliary input gear 58. Auxiliary input gear 58 rotates idler gear 56A (shown on driveshaft 52A in FIG. 2). Idler gear 56A then rotates pump idler gear 66A in direction O, the same direction driveshaft 34A rotates pump idler gear 66A with gear 30B. Pump idler gear 66A then rotates in direction O through coupling 68A. Pump idler gear 66B is also rotated in direction O through first and second drive shaft segments 34A and 34B and associated gearing.

Auxiliary input 26 is prevented from interfering with the bi-directional input of gear 30B with third clutch 64. Driveshaft 60B is in continuous connection with first driveshaft segment 34A. When driveshaft 60B is rotating in direction O (as by drive gear 30B) faster than auxiliary input 26, auxiliary input 26 is rotating in the opposite direction relative to auxiliary gear 58 and third clutch 64 does not engage. (As discussed above, first clutch 48A and second clutch 48B allow drive shaft segments 34A and 34B to be rotated faster than gear 30B rotates them.) Thus, auxiliary input 26 is able to override the input from drive gear 30B through third clutch 64 when auxiliary input 26 rotates in direction O faster than driveshaft 60B rotates in direction O from gear 30B. Auxiliary input 26 is controlled to selectively engage drive train system 12 when auxiliary power is needed, such as when pumps 24A and 24B are not providing enough lubrication to transmission 16. In one embodiment, a central computer of vehicle 10 controls auxiliary input 26. In other embodiments, operators of vehicle 10 manually control auxiliary input 26.

First clutch 48A, second clutch 48B and third clutch 64 can be either active or passive clutches. Active clutches are controlled by a computer or operator to selectively engage when power is needed for a particular source. Passive clutches, such as overrunning clutches, engage mechanically when needed. In the embodiment of the invention shown in FIG. 3, first clutch 48A, second clutch 48B and third clutch 64 are overrunning clutches. In various embodiments of the invention, first clutch 48A, second clutch 48B and third clutch 64 can be sprague type, ball type, ratchet type or any other overrunning type of clutches, or actively controlled friction or positive engagement clutches (i.e. tooth clutches). In one embodiment, pumps 24A, 24B and 48 are spur gear pumps. In one embodiment, auxiliary input 26 is an electric motor.

Drive train system 12 can be used to drive any type of system requiring uni-directional output from a multi-directional input, both inside and outside the context of vehicle 10. For example, drive train system 12 could be used to drive a cooling fluid or ventilation system inside vehicle 10. In other applications of drive train system 12 it could be used as a mechanism to convert the back and forth motion of ocean wave energy into a single direction output for a generator. Similarly, drive train system 12 could also be used to convert pendulum output into a single directional rotary output.

Although the present invention has been described with reference to preferred embodiments, workers skilled in the art will recognize that changes may be made in form and detail without departing from the spirit and scope of the invention.

The invention claimed is:

1. A gear and clutch cluster for producing uni-rotational output of a driveshaft from a bi-rotational input gear, the gear and clutch cluster comprising:
   a first gear engaged with the bi-directional input gear;
   an idler gear engaged with the bi-directional input gear;
   a second gear engaged with the idler gear;
   a first clutch connectable with the driveshaft and connected with the first gear, wherein the first clutch engages the driveshaft when the first gear rotates in a first direction faster than the driveshaft rotates in the first direction; and
   a second clutch connectable with the driveshaft and connected with the second gear, wherein the second clutch engages the driveshaft when the second gear rotates in a first direction faster than the driveshaft rotates in the first direction.

2. The gear and clutch cluster of claim 1 wherein the first clutch and the second clutch are overrunning clutches.

3. The gear and clutch cluster of claim 2 wherein the overrunning clutches are selected from a group consisting of: ball clutches, sprague clutches and ratchet clutches.

4. The gear and clutch cluster of claim 2 whereby the first clutch and the second clutch are configured to allow the driveshaft to be rotated in the first direction by an auxiliary input when the auxiliary input rotates the driveshaft in the first direction at a faster rate than the bi-rotational input gear.

5. The gear and clutch cluster of claim 1 wherein the first clutch and the second clutch are actively controlled clutches.

6. The gear and clutch cluster of claim 5 wherein the actively controlled clutches are selected from a group consisting of: friction clutches and positive engagement clutches.

7. A gear and clutch cluster for producing uni-directional output in a driveshaft from a bi-directional input rotating in first and second directions, the gear and clutch cluster comprising:
   first drive means for rotating the driveshaft in the first direction from input from the bi-directional input in the first direction;
   second drive means for rotating the driveshaft in the first direction from input from the bi-directional input in the second direction;
   first coupling means for disengaging the first drive means when the second drive means rotates the driveshaft in the first direction;
   second coupling means far disengaging the second drive means when the first drive rotates the driveshaft in the first direction;
   auxiliary drive means for producing output rotation of the driveshaft in the first direction from a uni-directional input; and
   third coupling means for selecting between the inputs of the bi-directional input and the uni-directional input.

8. The gear and clutch cluster of claim 7 wherein the second drive means comprises a gear positioned along the driveshaft for engaging the bi-directional input.

9. The gear and clutch cluster of claim 7 wherein first drive means comprises:
   an idler gear engaged with the bi-directional input; and
   an input gear positioned along the driveshaft for engaging the idler gear.

10. The gear and clutch cluster of claim 7 wherein the first coupling means comprises a first overrunning clutch positioned between the driveshaft and the first drive means, wherein the first overrunning clutch engages the driveshaft when the first drive means rotates faster than the driveshaft.

11. The drive train of claim 7 wherein the second coupling means comprises a second overrunning clutch positioned between the driveshaft and the second drive means, wherein the second overrunning clutch engages the driveshaft when the second drive means rotates faster than the driveshaft.

12. The drive train of claim 7 wherein the third coupling means comprises a third overrunning clutch engagable with the auxiliary drive means when the auxiliary drive means rotates faster than the driveshaft.

13. A uni-directional drive train for receiving input from a bi-directional input that selectively produces rotational input in a first direction and a second direction, and for receiving input from a uni-directional auxiliary input, the drive train comprising:
   a driveshaft rotatable by the bi-directional input at a first rate;
   a gear and clutch cluster positioned along the driveshaft, wherein the gear and clutch cluster receives input from the bi-directional input in the first direction and the second direction and for producing a rotational output of the driveshaft in the first direction; and
   an auxiliary gear system for receiving input from the uni-directional auxiliary input in the first direction;
   whereby the gear and clutch cluster allows the driveshaft to be rotated in the first direction by the auxiliary input when the auxiliary input rotates the driveshaft in the first direction at a faster rate than the bi-directional input.

14. The uni-directional drive train of claim 13 wherein:
   the gear and clutch cluster comprises:
      an idler gear coupled with the bi-directional input for producing an inverted rotational input;
      a first clutch positioned near a first end of the driveshaft and coupled with the bi-directional input, wherein the first clutch engages the driveshaft when the first clutch rotates in the first direction at a faster rate than the driveshaft rotates in the first direction; and
      a second clutch positioned adjacent the first clutch and coupled with the idler gear, wherein the second clutch engages the driveshaft when the second clutch rotates in the first direction at a faster rate than the first driveshaft rotates in the first direction; and
   the auxiliary gear system comprises:
      a third clutch that engages when the auxiliary input rotates the driveshaft in the first direction at a faster rate than the bi-directional input.

15. The uni-directional drive train of claim 14 wherein the first clutch and second clutch are coupled with the bi-directional input and first idler gear, respectively, with spur gears positioned concentrically around the clutches.

16. The uni-directional drive train of claim 14 wherein the first clutch and second clutch are overrunning clutches.

17. The uni-directional drive train of claim 14 wherein the first clutch and the second clutch are actively controlled clutches.

18. The uni-directional drive train of claim 14 wherein the third clutch is an overrunning clutch.

19. The uni-directional drive train of claim 14 wherein the third clutch is an actively controlled clutch.

20. The uni-directional drive train of claim 14 wherein the driveshaft is comprised of a first driveshaft segment and a second driveshaft segment.

21. The uni-directional drive train of claim 20 wherein the first clutch is positioned on the first driveshaft segment, and the second clutch is positioned on the second driveshaft segment.

22. The uni-directional drive train of claim 13 wherein the bi-directional input is a gear from a vehicle transmission.

23. The uni-directional drive train of claim 13 wherein the uni-directional auxiliary input is an electric motor.

24. The uni-directional drive train of claim 13 and further comprising a first fluid pump coupled with the driveshaft for providing a first flow of lubrication.

25. The uni-directional drive train of claim 24 and further comprising a second fluid pump coupled with the driveshaft for providing a second flow of lubrication.

26. The uni-directional drive train of claim 25 wherein the first fluid pump and second fluid pump are spur gear pumps.

27. The uni-directional drive train of claim 13 wherein the driveshaft is connected to a vehicle differential and vehicle propulsion devices.

* * * * *

UNITED STATES PATENT AND TRADEMARK OFFICE
CERTIFICATE OF CORRECTION

PATENT NO. : 7,389,712 B2 Page 1 of 1
APPLICATION NO. : 11/284383
DATED : June 24, 2008
INVENTOR(S) : Richard A. Himmelmann It is certified that error appears in the above-identified patent and that said Letters Patent is hereby corrected as shown below:

Column 2, Line 26, delete "228", insert --22B--

Signed and Sealed this

Second Day of September, 2008

JON W. DUDAS
*Director of the United States Patent and Trademark Office*